United States Patent Office 3,411,624
Patented Nov. 19, 1968

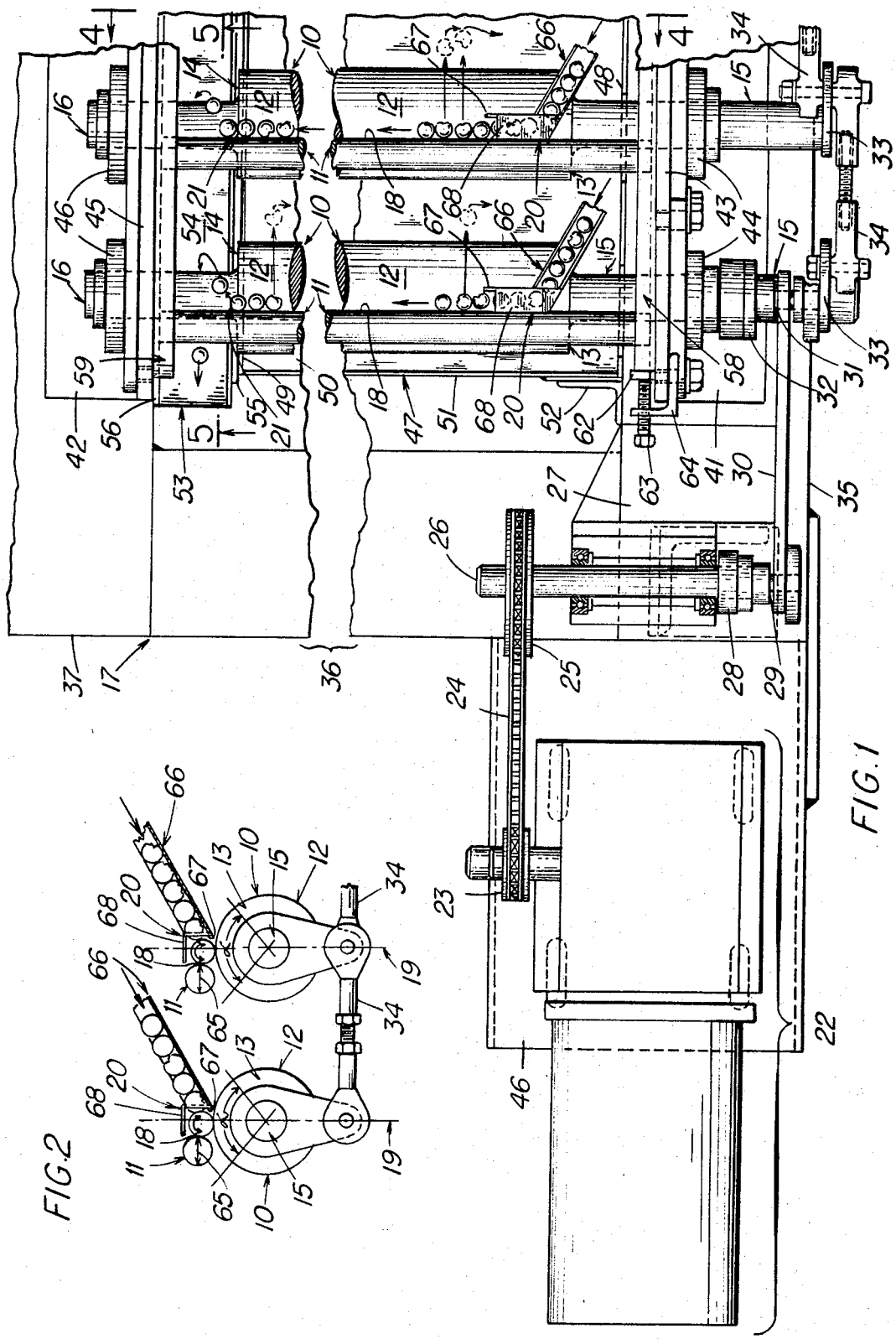

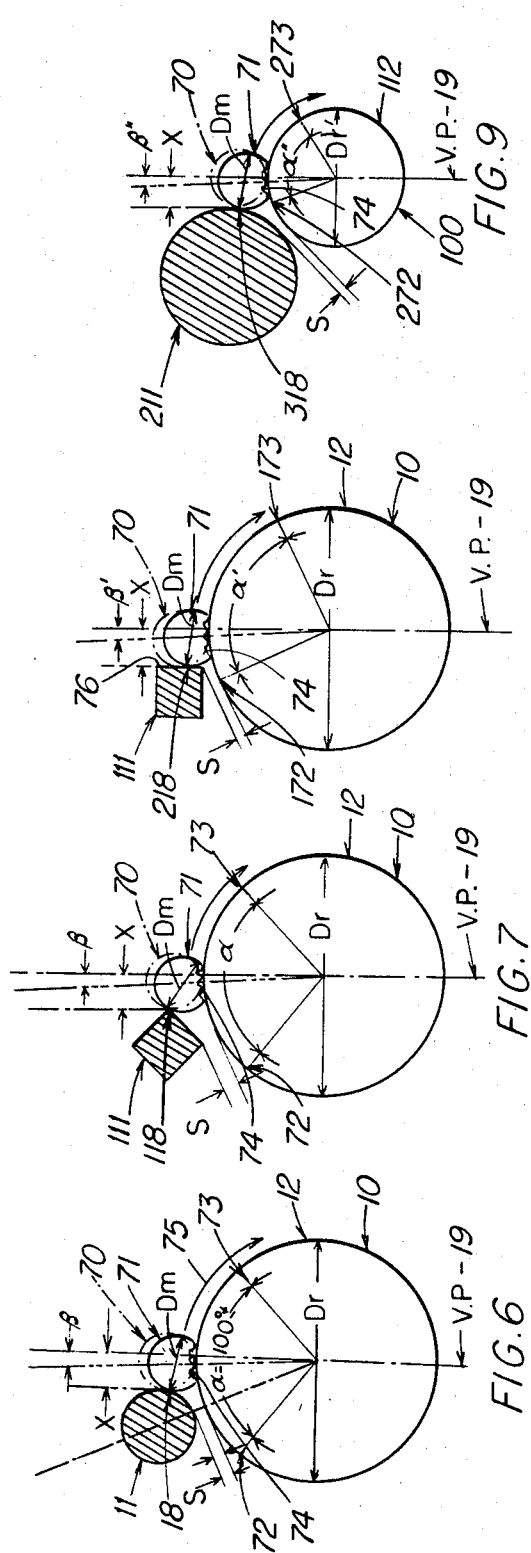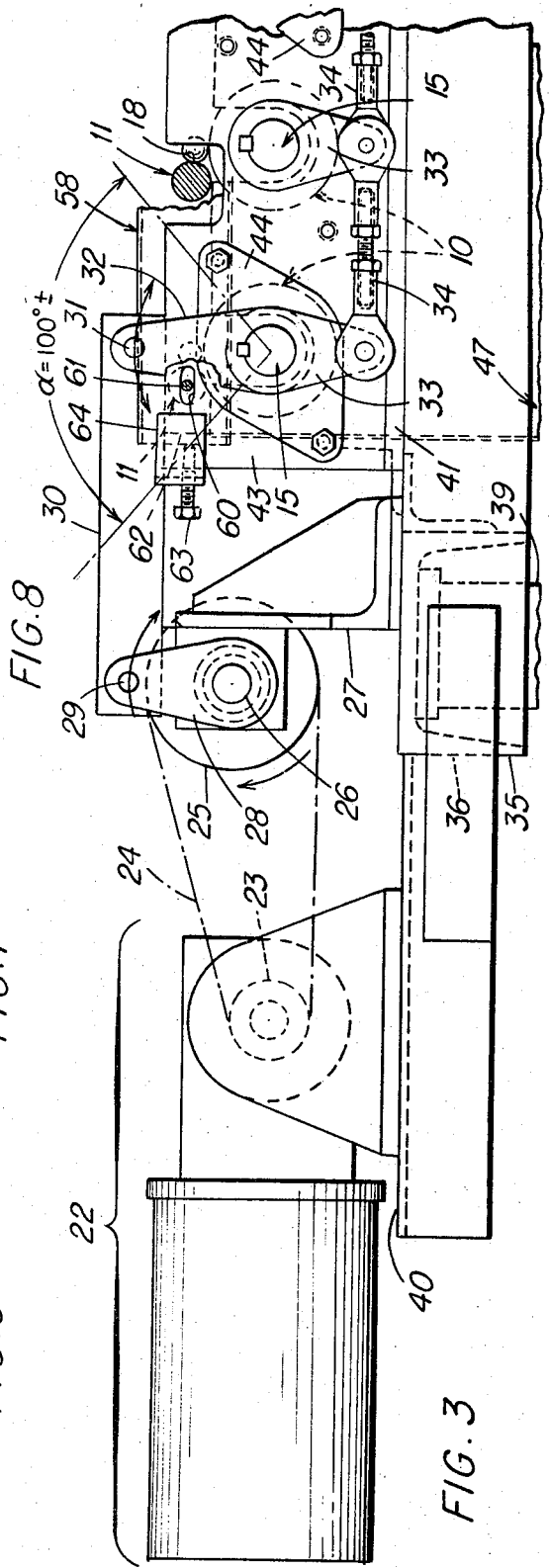

3,411,624
MARBLE SORTER SELECTIVELY REJECTABLE OF MISSHAPEN MARBLES AND FRAGMENTS THEREOF
Saul Warshaw, New York, Winton Loveland, Freeport, and Frank A. Denchick, Lake Ronkonkoma, N.Y., assignors to The Loveshaw Corporation, Farmingdale, N.Y., a corporation of New York
Filed Apr. 11, 1967, Ser. No. 629,992
10 Claims. (Cl. 209—101)

ABSTRACT OF THE DISCLOSURE

A sorter or sorting feeder for marbles of certain diameter which selectively sorts them and rejects those excessively misshapened as well as marble fragments. A canted trough down which the supplied marbles may roll is defined by an elongated rotatable roller and an elongated guide member mounted to one side of and transversely spaced from the top portion of the roller. Driving means arcuately oscillates the roller back and forth so that it kicks rejects sideways out of the trough and permits good marbles to roll out from the lower end of the latter. Gravity operated marble supply means for the trough is equipped at the trough with guard means to prevent marbles from bouncing out over either the roller or guide member into rejects collecting means.

Background of the invention

The invention relates to a marble sorting mechanism which selectively rejects misshapen marbles and fragments while delivering acceptable marbles to a point of use. It particularly pertains to such a sorter or sorting feeder useful in supplying glass cullet in the form of marbles to electrically heated bushings and furnaces for producing glass fibers.

Glass marble cullet to serve as the feed material for heated glass fiber producing bushings and furnaces conventionally is economically and rapidly made by gravity flowing streams of melted glass from a preheating furnace, cutting the soft hot glass into slugs and shaping the latter while still soft between rotating screws. The so produced marbles are thus not exactly spherical but many are substantially spherical, although possibly characterized by minor imperfections, as to be acceptable for feeding through suitable distribution systems to the glass fiber producing bushings and furnaces. Many others of the so formed marbles have heavily chipped sides and large flats or indentations, or projecting nibs, while some may be broken into fragments later due to faulty annealing or handling. Such badly formed marbles and fragments hazard jamming in distribution systems which reduces charges in the fiber producing bushings and furnaces sufficiently to cause destructive overheating resulting in production stoppage or production of inferior fibers for a long time thereafter.

Prior to the present invention it has been proposed to provide in supplying means for delivering such glass marbles a sorter in the form of a pair of sloping, elongated, fixed round rods arranged substantially parallel to each other and spaced transversely less than the diameter of the smallest marbles to be handled to form a canted open-bottom chute. Generally spherical marbles which are acceptable by distribution systems for delivery to a point of use will roll down such a chute while small fragments may fall through between the fixed rods, provided the chute is free of chute-jamming large fragments and stopped marbles having large flats or recesses formed by heavy chipping, indentations or protuberances that cause roll-stopping seating thereat against one of the fixed rods. Also, faulty marbles which hazard the development of jams in distribution systems, due to heavily flatted and chipped or indented sides and projecting nibs, frequently may attain a stability in rolling down such a fixed-rod chute that keeps their greatly misshapen sides out of contact with such fixed guide rods or other fixed chute-defining structure while rolling theredown, so as to make attempted selective removal by separate kick-off means ineffective. In developing the present invention it was found that even if one of the round chute rods was continuously rotated in one direction there was a resulting tendency to spin each marble around a single axis as it rolled down the chute, so that any such bad area thereon would tend to be kept free of contact with the rotating rod and thus free of any kick-off influence that might otherwise have been imparted thereto by the rotating rod.

Others have proposed in the prior art complicated separating devices featuring rotary disks, which are relatively costly to construct and maintain, that depend for separating effectiveness upon the inherent characteristic of substantially spherical objects to roll along certain paths to designated delivery points and upon responses to centrifugal force as modified by mass and different shapes affecting frictional drag.

These problems have been effectively solved in a simple and economical manner by the feeder of the present invention.

Summary of the invention

The sorting feeder of the present invention is characterized by means which is readily inserted in the travel path of marbles deliverable in a simple and efficient manner to a point of collection or use without desirably checking their rate of movement while effectively separating therefrom an acceptably high percentage of potentially trouble-causing damaged marbles. This marble sorting feeder is adapted for efficient use in a variety of types of services, in addition to the service herein illustrated by way of example for supplying glass marbles as cullet to heated bushings or furnaces for producing glass fibers. The term "marble" is used herein in a broad sense as identifying a variety of types of spherical bodies. For all such purposes this sorting feeder includes a rotatably oscillated, elongated roller having any of a variety of types of surfaces, such as smooth, roughened, ribbed, fluted, dimpled, provided with raised buttons, or other forms of textured surfacing. For some services such forms of surfaces may be provided on sleeves fitted over the basic roller bodies. If the service in which the sorting feeder is employed demands the handling of very hot marbles such surfacing sleeves will be formed of suitably heat resistant materials. While the oscillatory roller preferably may be cylindrical with the supporting bearings therefor being coaxial therewith such roller may be oval or elliptical in cross-section, or such a cylindrical roller may be rotatably supported about an axis eccentric to its axis, etc. The axis of the oscillatable roller extends laterally with one end thereof mounted slightly higher than the other.

The sorting feeder also includes an elongated guide member mounted to extend along side of and generally in the same direction as the orientation of the longitudinal dimension of the roller, e.g., generally parallel to this oscillatable roller, and to one side of the top portion of the latter. This guide member, which preferably is rigid, may be an elongated rod, bar or strap of any one of a number of cross-sectional shapes such as circular, rectangular, diamond-shaped, oval, etc., and fixed against rotation or mounted for free undriven or driven rotation if round or oval. Such guide member has a marble-engaging longitudinal side portion spaced transversely from the peripheral surface of the roller a distance less than the diameter of the smallest marble to be handled by this sorting feeder to prevent marble escape therebetween. The oscillatable roller and the guide member together define a canted, open-bottom, gravity delivery through having an acceptable marble delivery end at lowest elevation and an entrance location that is nearer the other end of the trough. The marble-engaging longitudinal side portion of the guide member is offset transversely to one side of a vertical plane through the roller axis a distance which is greater than the marble radius, so that when the marbles are fed to the trough the center of mass of each is located to this side of such plane thereby assuring that they will tend to remain in the trough and roll theredown to the delivery end if severe damage is absent.

The oscillation of the roller will cause each marble in the trough to roll successively about a plurality of axes and will break up most patterns of rolling motion that may tend otherwise to keep a faulty side thereof from coming into contact with the transversely moving surface of the roller, which would thus tend to roll down the trough to the delivery end rather than otherwise cling in the faulty area to the roller surface for kick-off by the oscillatory motion of the roller sideways out of the trough and over the roller to rejects collecting means. The stroke of roller surface transverse travel away from the guide member in each cycle of oscillation must be sufficient to move the centers of mass of most of the faulty marbles, and of the marble fragments which will not escape through the open bottom of the trough, up over the crown of the top portion of the roller and beyond the vertical plane through the roller axis to a point where they will slide down the far side of the roller to the rejects collecting means, even though the roller may have reached the extreme of its forward rejecting motion and reversed to return its top surface portion toward the guide member. Each marble size and mass dictates, at least partially, a different set of conditions for attainment of the sorting desired, such as the spacing between the roller and guide member, the stroke of the oscillations and the cyclic rate of the latter. Also, the transverse dimensions of the roller or its diameter has a bearing thereon. Given any set of conditions one can readily determine the requirements dictated by a particular demand.

The sorting feeder is provided with any suitable receiving or collecting means for the rejects, which may comprise or include an open-top receiver or pan having at least a receptive portion located along the far rejecting side of the oscillating roller, Acceptable marble collecting means, in any suitable form, such as an open-top pan or chute, or receptive mouth of a distribution system or delivery means, is located at the delivery end of the trough.

While the invention is completely satisfied by a single roller and guide member-defined trough a plurality thereof may be provided, ganged together for simultaneous performance of the sorting and rejecting action.

Any suitable supply means may be provided for feeding marbles and fragments thereof, or cullet, to embodiments of the present sorting feeder. However, it may be desired to provide as such one or more gravity feeding chutes or channels for this purpose, connected to a suitable supply source, e.g., one or more supply hoppers. If such a gravity feeding chute or channel means is employed for this purpose it is preferable that vibration inducing means, conventional or otherwise, be provided to vibrate such supply means, or chutes or channels thereof, to prevent undesirable hang-up therein. The use of gravity feeding chute or channel supply means also demands provision of suitable guard means associated with the outlet end or ends thereof located at an entrance location along each trough (either at the top end thereof or nearer its delivery end). Such guard means should include a marble stop structure mounted above the roller in opposed relation to and spaced laterally from the marble-engaging side portion of the guide member a distance greater than the diameter of the largest marble to be supplied; this stop structure being positioned transversely opposite the point of impact of the supplied marbles with the guide member to prevent them from being bounced back over the roller to rejects receiving or collecting means. It is also desirable that the guard means include additional marble stop structure mounted laterally above the entrance location of the trough a distance greater than the largest marble diameter to prevent supplied marbles upon impact with the guide member from bouncing up over the latter. Thus such guard means may be in the form of a side flange and a top flange closing in the entrance section of the sorting trough, or any other suitable structure defining thereat a tunneled marble restrictive cage through which the supplied marbles can roll down the trough or out of which marble fragments may be worked by the oscillatory motion of the roller.

In certain embodiments it may be desirable to mount either one or both ends of the guide member adjustably for lateral or transverse shift of either one or both ends of the guide member relative to the longitudinal zone of the top portion of the roller down which acceptable marbles are to roll in the sorting operation, for permitting desired variation of the acceptance operation with respect to marbles of a certain size or to adapt the mechanism to different sorting procedures with respect to spherical bodies of different sizes.

*Brief description of the drawings*

Other objects of the invention will in part be obvious and will in part appear from reference to the following detailed description taken in connection with the accompanying drawings, wherein like numerals identify similar parts throughout, and in which:

FIG. 1 is a top plan view, with parts broken away and in section, of an embodiment of the marble sorting feeder of the present invention particularly designed for the sorting and feed of spherical cullet bodies to glass fiber producing bushings or furnaces;

FIG. 2 is an end elevational view of oscillatory roller, guide member, and marble supply means of the mechanism illustrated in FIG. 1, depicting a pair of these basic elements of the invention ganged together for simultaneous operation;

FIG. 3 is a front end elevational view, with parts broken away and with some details omitted for clarity, of the sorting feeder mechanism depicted in FIG. 1;

FIG. 6 is a diagrammatic illustration of the oscillatory roller and guide member associated therewith embodied in each combination of basic elements of the present invention in the gang of six thereof associated together in the mechanism illustrated in FIGS. 1 to 5 incl., the oscillatory action of the roller and the resulting transverse kick off of an unacceptable marble resulting from such oscillatory action being indicated therein;

FIG. 7 is a diagrammatic illustration similar to FIG. 6, depicting a different form of guide member that may be embodied in each combination of basic elements;

FIG. 8 is a diagrammatic illustration similar to FIG. 7, but depicting still a different form of guide member which may be attained by reorientation of the one shown in FIG. 7; and FIG. 9 is a further diagrammatic illustration of the types shown in FIGS. 6 to 8 incl., depicting variation from that shown in FIG. 6 comprising a different ratio of the diameters of the guide rod and oscillatory roller and the angle of oscillation of the latter.

*Description of preferred embodiments*

Figure 4:
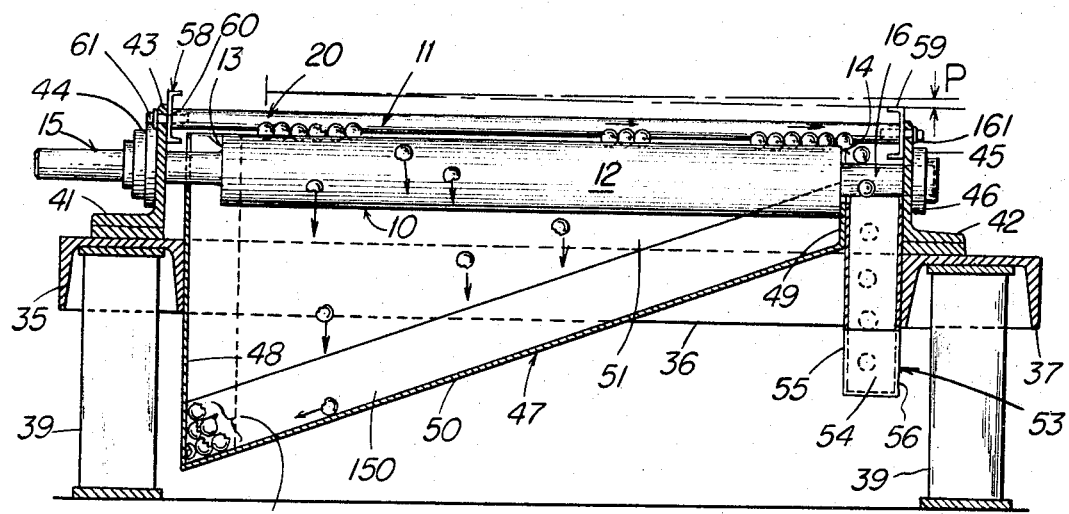
FIG. 4 is a sectional view, taken substantially on line 4—4 of FIG. 1, showing in side elevation one of the basic elements thereof comprising one of the oscillatory rollers and its associated guide member, and illustrating sorting action to separate from acceptable marbles those which are unacceptable for feed to a glass fiber producing furnace.

It will be seen from FIGS. 1 to 5 incl. that an embodiment of the feeder for marbles of certain diameter which is selectively rejectable of misshapen marbles and marble fragments, as designed particularly for useful service in sorting glass marbles to be employed as feed material or cullet for charging glass fiber producing bushings or furnaces, may comprise a plurality or gang of the basic trough unit or combination of the present invention. It will be noted therein that each such trough basic unit includes an elongated oscillatory roller 10 and an elongated guide member 11 associated in substantial parallelism therewith. Each of the elongated oscillatory rollers 10 has a marble-engaging peripheral surface 12 and is rotatably supported upon a laterally-extending fixed axis with one end 13 thereof mounted at an elevation slightly higher than its other end 14. Roller 10 may be an elongated cylindrical body of steel having its surface carefully ground and polished and then plated with hard chrome, by way of example preferably being about three and one-half inches (3½″) in diameter and thirty inches (30″) long for the service intended. Such roller 10 may be provided with end stub shafts 15 and 16 respectively extending coaxially from the roller ends 13 and 14 for suitable rotary support by bearings fixedly mounted on suitable frame structure 17.

Each of the elongated guide members 11 which is associated with one of the oscillatory rollers 10 may be in the form of an elongated cylindrical rod of hardened stainless steel that may be about one inch (1″) in diameter and carefully straightened so that its axis is a true straight line, as is that of each of the rollers 10. In each trough basic unit or combination of elements the elongated guide member or rod 11 is mounted generally parallel to the roller 10 with which it is associated and to one side of the top portion of the latter, as will be understood from FIGS. 1, 2, 3 and 5. The peripheral surface of each of these guide members or rods 11 thus provides a marble-engaging longitudinal side portion 18 spaced transversely from the peripheral surface 12 of the roller with which it is associated a distance less than the marble diameter, the latter being conventionally about three-quarters of an inch (¾″) when such marble constitutes a glass cullet body for use in the production of glass fiber. This transverse spacing is designed to prevent substantially spherical cullet or marbles fed to such unit from escaping through the gap between the oscillatory roller 10 and such guide member or rod 11, as is more fully explained later with respect to FIGS. 6 to 9 incl. The longitudinal side portion 18 of each guide member or rod 11 is also offset transversely to one side, such as to the left, of a vertical plane 19 through the roller axis a distance which is greater than the radius of such marble, as will be seen in FIG. 2. Consequently, the oscillatory roller 10 and the guide rod 11 of each basic unit together define a gravity delivery trough 12–18 having an entrance location along the trough which is nearer the end of the latter that is higher than the delivery end 21 thereof. The approximate entrance location which may be preferred for each of these troughs 12–18 is indicated at 20 in FIG. 1, in which is also shown that the delivery end 21 of the trough, from which the accepted, substantially-spherical marbles roll to collection or delivery means, preferably is located substantially at the lower roller end 14. In the embodiment illustrated in FIGS. 1 to 5 incl., the pitch of the delivery end of the troughs 12–18 at 21 relative to the entrance location 20 thereof, indicated at P in FIG. 4, may be about three-eighths of an inch (⅜″) which is sufficient to induce the acceptable marbles to roll down to the end of the oscillating roller 10 and fall into a suitable collecting means, that may be in the form of a delivery compartment hereinafter described.

Suitable driving means are provided rotatably to oscillate each of the rollers 10 about its axis through an appreciably large radial angle which rotates any given point on the peripheral surface 12 thereof transversely along an arcuate path that is appreciably longer than the mentioned offset distance between the marble-engaging longitudinal side portion 18 of the guide rod 11 and the vertical plane 19 through the roller axis. In FIG. 2 such angle of oscillation is indicated at α which for the embodiment of the machine illustrated in FIGS. 1 to 5 incl. may be a minimum of about 40° and a maximum of about 100°, and in a machine that has been designed for this service such angle is slightly less than 90°. This angle of throw α must be sufficient to assure that any marble which has a relatively large flatted side or misshapen area, such as is indicated at 74 in FIGS. 6 to 9 incl., due to heavy chipping or imperfection in forming the spherical surface, or a recess at the base of a projecting nib defined between a side of the latter and the adjacent spherical surface of the marble, will be turned about its center by the oscillatory motion of the roller 10 so that its heavily flatted or fractured side, or such recess thereof, is brough to adjacency with the peripheral surface 12 of the oscillating roller for cling or frictional contact in this area to the roller surface to insure kicking transversely away from the guide rod 11 to a point where it will slide down over the downwardly sloping portion of the roller surface and fall away in the forward or advancing portion of the cycle of oscillation. It is to be understood that this kick-off need not be accomplished in one cycle of oscillation so long as the damaged marble requiring rejection will at least be progressively moved step-by-step sufficiently away from the guide rod 11 so as ultimately to be located far enough beyond the central vertical plane 19 where the downwardly curving peripheral surface 12 of the roller 10 makes the clinging of the imperfection thereto sufficiently percarious to cause relative sliding during the return stroke and completion of kick-off on the next forward stroke of the succeeding cycle of oscillation. While the frequency of the oscillatory cycles may vary widely it has been found that in the embodiment illustrated in FIGS. 1 to 5 incl. a frequency of about fifty (50) cycles per minute or slightly less gives excellent results. The oscillatory roller 10 has associated therewith suitable rejects receiving means mounted along the longitudinal side of the roller which is located to the opposite side of the mentioned vertical plane, i.e., remote from the guide rod 11, so that the kicked off rejects will drop thereinto away from the peripheral surface of the oscillatory roller remote from the guide rod side, as will be explained more fully hereinafter. The driving mechanism for oscillating the roller 10 of any particular embodiment may be such as to permit ready adjustment of the angle of throw α.

Any suitable means for oscillating the roller 10 about its axis through an appreciably large radial angle of throw α that will oscillate any given point on the roller peripheral surface 12 transversely back and forth along an arcuate path, may be employed. Such driving means for the embodiment illustrated in FIGS. 1 to 5 incl. is indicated as including an electric motor and speed reducer assembly 22 having a driving pully 23 about which is lapped an endless driving chain 24, in turn lapped about a driven pulley 25 fixed upon a drive shaft 26. The drive shaft 26 is rotatably supported in suitable bearing means mounted upon a fixed bracket 27. The drive shaft 26 carries fixed thereto a crank arm 28 having its free end pivotally connected at 29 to one end of a connecting rod, in the form of a link plate 30, with the other end of the latter pivotally connected at 31 to the outer end of another crank arm 32, in turn fixed upon the stub end shaft 15 of the roller 10 embodied in the first selector-rejector trough 12–18 unit of the gang thereof provided in the machine of FIGS. 1 to 5 incl. Thus, as the crank arm 28 is rotated the connecting rod 30 will cause the crank arm 32 and the roller 10 on which it is fixedly mounted to be oscillated back and forth through an angle of throw α of about 100°, as is indicated in FIG. 3. If crank arm 28 is made adjustable in length varying the length thereof will modify the angle of throw α, and if desired, crank arm 32 may be made adjustable in length in like manner to retain the symmetry of this drive.

For the purpose of reciprocating the plurality of rollers 10 of the gang of selector-rejector trough 12–18 units the stub shaft 15 of each carries fixedly mounted thereon a crank arm 33. The outer ends of the crank arms 33 of the first two trough 12–18 units are linked together by a connecting rod 34 and, as will be understood from FIGS. 1 and 3, a similar connecting rod is employed to connect such crank arms of the second and third trough units. Similar crank arms for the succeeding pairs of rollers are interconnected by similar connecting rods, so that all of the rollers of the succeeding trough 12–18 units are oscillated simultaneously. It will be noted by comparison of FIGS. 1 and 3 that the crank arms 33 carried by the respective rollers 10 may, as is indicated in FIG. 3, be substantially aligned with vertical planes through the axes of the respective rollers 10, but as is well understood, such crank arms may be fixed to the respective roller stub shafts 15 at other radial positions to obtain the same results, and such is indicated in FIG. 1 for clarity in illustration.

The machine frame 17 may, if desired, be made in box formation from four lengths 35, 36, 37 and 38 of inverted steel channel, welded together at the corners thereof. This box frame may be suitably supported upon a plurality of pedestals 39.

Frame members 35 and 36 may have mounted thereto a lateral platform 40 on which the motor and speed reducer assembly 22 is mounted, and these frame members may also support the cross shaft-supporting bracket 27. Elongated brackets 41 and 42, preferably in the form of lengths of angle iron, may be supported respectively by the top faces of frame members 35 and 37. Vertical flange 43 of the bracket 41 supports a plurality of suitable bearing units 44 through which extend the roller stub shafts 15 and vertical flange 45 of bracket 42 supports a plurality of bearing units 46 for the roller stub shafts 16.

As has been previously indicated the oscillatory roller 10 and the guide rod 11 arranged substantially parallel thereto, together defining the trough 12–18 down which substantially spherical marbles will roll, are given a relatively minor degree of downward pitch from the entrance location at 20, where the cullet is supplied to such trough, to the delivery end of the latter which terminates at the end 14 of the oscillatory roller, such pitch being indicated at P in FIG. 4. This, of course, is readily provided by mounting the bearing units 46 on bracket flange 45 slightly lower than the mounting of the bearing units 44 on the bracket flange 43.

Since the marble fragments and the unacceptably misshapen marbles are to be ejected from each trough 12–18 by oscillation of its roller 10 transversely over the latter, the rejects receiving means may, as is indicated in FIGS. 1, 3 and 4, be in the form of a collecting pan 47 best shown in FIG. 4. Such collecting pan 47 may have a substantially vertical, deep front wall 48 and a substantially vertical, shallow back wall 49 interconnected at their bottom edges by a forwardly sloping bottom panel 50. Trapezoidally-shaped and transversely-spaced sidewalls 51 respectively may close in the opposite sides of the rejects receiving pan 47. The deep front wall 48 may be supported in any suitable manner by the inside face of the frame member 35, and supplemental supporting brackets, such as the one indicated at 52 in FIG. 1 may be provided, if desired, to mount the opposed sidewalls 51 thereto. Such collecting pan 47 is suspended beneath all of the troughs 12–18 so that the rejects kicked off of the oscillating rollers 10 thereof will drop down between the far side of the roller of a preceding unit and that of the next succeeding unit, as is indicated in FIG. 1.

While such rejects receiving means or pan 47 may be provided at the lowest point of elevation of its bottom panel 50 with outlet means to feed the rejects to another point of use it may be in the form of a collector from which rejects accumulated therein may be periodically removed for use in specially constructed bushings or electric furnaces. For this purpose, one of the sidewalls 51 may be omitted, such as that not shown in FIG. 4, and a side flange of the bottom panel 50 be provided in lieu thereof by turning up the edge of the bottom panel similarly to that proposed at 150 to retain the damaged cullet on the bottom panel while permitting ready access thereover to these rejects for removal.

Figure 5:
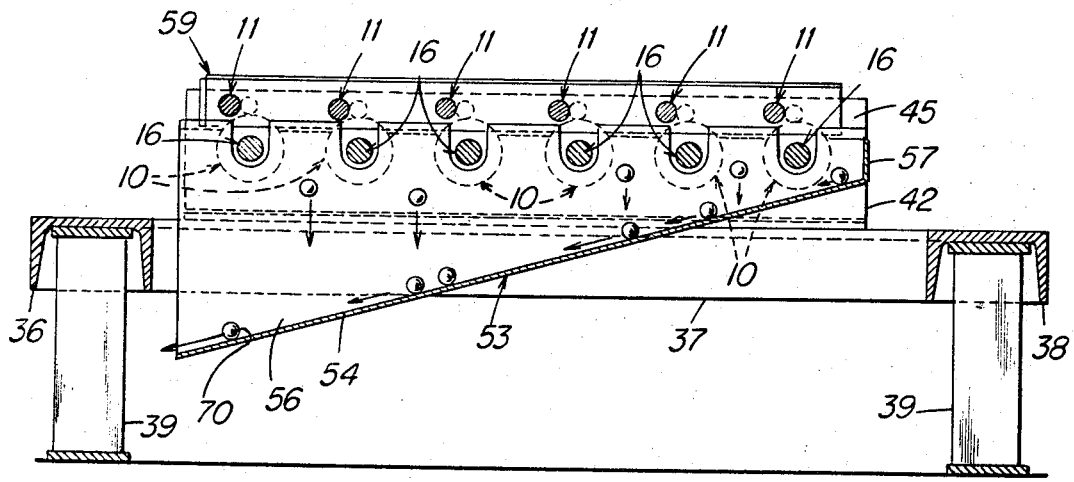
FIG. 5 is a sectional view taken substantially on line 5—5 of FIG. 1, indicating that a gang of six of the basic elements may, if desired, be embodied therein, certain associated parts being omitted for clarity while illustrating acceptable marble collecting means associated therewith for feed of the acceptable marbles to a suitable distribution system, the oscillatory roller of each gang being indicated in broken lines since the line of sectioning does not pass transversely therethrough.

As will be best understood from FIGS. 1 and 5 the acceptable marbles will roll to the ends of the plurality of troughs 12–18 provided by the gang of separator-rejector units to drop off of the lower ends 14 of the oscillatory rollers 10 thereof and pass between their stub shafts 16 into a transversely extending collecting means or chute, shown in FIGS. 1, 4 and 5. The chute 53 is provided with a downwardly sloping bottom 54 extending between opposed trapezoidally-shaped sidewalls 55 and 56 with the latter suitably supported by the inside face of frame member 37. The back wall 49 of the rejects receiving pan 47 and the sidewall 55 of the acceptable marble collecting chute 53 may be connected together for support of the former by the latter. As is shown in FIG. 5 the bottom panel 54 of the acceptable marbles chute 53 may be turned up on its relatively shallow end there to provide a substantially vertical end wall 57. Such acceptable marbles collecting means in the form of chute 53 may deliver the acceptable marbles sorted thereinto to any suitable distribution means or system adapted to supply the good cullet to a glass fiber producing furnace, such as that proposed in Simison U.S. Patent No. 2,482,071, through one or more holes in the top of the furnace, such as that indicated in FIG. 2 of Slayter et al. U.S. Patent No. 2,300,736.

As is shown in FIG. 2, and as has been previously indicated each guide rod 11 is mounted generally parallel to the oscillatory roller 10 with which it is associated and in a relatively fixed or stationary position for any particular operation. This relative position of the guide rod 11 is at a location where the center of gravity of acceptable or good marbles is located to the same side of the vertical plane 19 through the axis of the oscillatory roller 10, so that each good marble will remain in the trough defined by the opposed portions of the guide rod and roller to roll down to the discharge end 21 thereof. It has also been found to be advantageous to provide means for permitting lateral adjustment of the position of such guide rod 11 relative to the oscillatory roller 10 with which it is associated. Such adjustability permits change of the sensitivity of the selector-rejector feeder. Selecting a particular position for the guide rod 11 relative to the vertical plane 19 through the axis of the oscillatory roller 10 with which it is associated is dictated largely by statistical experience. While for a given positional setting of the guide rod 11 it will be found that this machine will reject most unacceptable or bad marbles it may also reject a small percentage of the acceptable or good ones. If the position of the stationary guide rod 11 is moved laterally farther away from the vertical plane 19 the amount of the acceptable or good marbles which are rejected will be decreased, but at the same time the amount of the unacceptable or bad ones that will be delivered from the end of the trough 12–18 into the acceptable marble collecting means will increase. Conversely, if the position of the guide rod 11 is moved laterally closer to the vertical plane 19 the rate of rejection of unacceptable or bad marbles will increase, but also the rejection rate of the acceptable or good ones will increase. One can readily determine the proper position of guide rod 11 relative to the oscillatory roller 10 with which it is associated that will satisfy the demand with regard to the relative proportions of rejects and desired retentions. For example, in the embodiment of the selector-rejector feeder illustrated by way of example in FIGS. 1 to 5 incl., for the purpose of sorting glass marbles of a diameter of about three-quarter of an inch (¾″) it has been found to be desirable to adjust the lateral position of each guide rod 11 where the center of each of the good marbles will be located approximately one-eighth of an inch (⅛″) beyond that same side of the vertical plane 19 through the oscillatory roller 10. Such a machine, when so adjusted, will effectively separate out about seventy-five to eighty percent (75–80%) of the undesirable cullet, and the remaining twenty-five to twenty percent (25–20%) thereof will be of the least misshapen and thus of the lesser trouble causing type, which from a practical point of view is sufficiently effective for this type of service.

Various suitable means may be employed to provide for ready adjustment of the lateral position of such guide rod or member 11 relative to the oscillatory roller 10 with which it is associated, one such means being illustrated in FIGS. 1, 3, 4 and 5. As will be seen therein a pair of opposed elongated channel members 58 and 59 are respectively mounted for transverse sliding action of the back faces of their webs along the inside faces of the bracket flanges 43 and 45. Suitable means may be provided for such transverse adjustment of channel 58 relative to bracket flange 43, which will permit clamping it in a selected adjusted position. For example, as will be seen from FIG. 3 bracket flange 43 may be provided with elongated, transversely-extending slot 60 opposite the area of web of channel 58 where the front end of guide rod 11 is fixed by any suitable means, such as welding. An internally-threaded hole may then be formed through the channel web into the end of the guide rod 11 threadably to receive an externally-threaded clamping screw 61 (see FIGS. 3 and 4). When this clamping screw 61 is loosened its shank may be slid in the transverse slot 60 to the selected position and then tightened to clamp this forward end of the guide rod 11 fixedly thereat. When the selector-rejector feeder is equipped with a gang or a plurality of the trough 12–18 units, each defined by one of the oscillatory rollers 10 and associated guide rod 11, with the front ends of all of the latter fixed to channel 58, a similar transverse slot and clamping screw may be provided for the opposite end of the channel 58, so that together a pair of such clamping screws will also serve to support this mounting channel and the ends of the guide rods carried thereby to the supporting bracket 41, while permitting lateral adjustment thereof simultaneously. Similarly, the transverse channel 59 in the vicinity of the discharge ends 21 of the troughs 12–18 may be mounted for transverse adjustment by like clamping screws 161 (see FIG. 4) with their shanks extending through similar transverse slots in the flange 45 of the mounting bracket 42.

Such adjustable mounting means for the support of the ends of the guide rods 11 may include readily adjustable means for attaining manually the lateral shift of the mounting channels 58 and 59 when the clamping screws 61 and 161 are loosened. As will be seen from FIGS. 1 and 3 such means may include a bearing block 62 fixedly carried by the end of channel 58, against which bears the inner end of an adjustment screw 63 threadably supported by a bracket 64 fixed upon the bracket flange 43. The opposite end of the channel 58 may be provided with similar adjusting means, so that when one of these adjusting screws is loosened the other may be tightened to attain desired lateral shift of the guide rod carrying channel 58. Similar manual shifting means may be provided for channel 59. Such laterally adjustable mount of the guide rods 11 is indicated in the diagrammatic showing of FIG. 2 by the double-ended arrows 65.

This adjustable mounting of one or more of the guide rods 11 may, if desired, be confined to the ends of the latter which are nearest to the entrance location 20 of the one or more troughs 12–18, leaving the mount of the ends of one or more of the guide rods 11 at the discharge ends 21 of the one or more troughs relatively fixed at a mean position. For this purpose the channel 59 may be fixed to the bracket flange 45 and the ends of the guide rods 11 mounted in this channel for limited free transverse swinging action in any suitable manner, such as by pins which will allow the swing, but prevent transverse movement of the guide rod ends. Thus the transverse adjustment may be confined, if desired, to the entrance end, such as by means of slidable channel 58 and its transversely adjusting equipment described above. In such case the variation in the offset distance between the vertical plane 19 and the marble-engaging longitudinal side portion 18 of each guide rod 11 will be effective for adjustment of the sensitivity of the selecting and rejecting action which will begin at the entrance location 20 of the trough 12–18, and by the time the cullet has been worked down the trough toward the delivery end 21 thereof a major amount of the undesirable cullet will have been kicked out to the rejects receiving means, so that there is lesser need for provision of such transverse adjustment of the guide rods in the vicinity of the delivery ends of the troughs.

As a means of supply of the cullet to the one or more selector-rejector troughs 10 one may employ a vibratory hopper, or other suitable means. The cullet may then be fed from the discharge of such vibratory hopper to the entrance location at 20 of each trough 12–18 by any suitable guidance track. Such guidance track may, for example, be provided in the form of a feed channel 66 which extends obliquely downward and forward to the entrance location 20 of each trough 12–18 (see FIGS. 1 and 2). Such feed channel 66 should be wide enough to accommodate the largest and most misshapen marbles or cullet pieces and preferably is vibrated so that faulty cullet will not jam or hang up therein. Since gravity feed is relied upon in the employment of such feed channel there may be a tendency for the more spherical marbles to run freely down such vibrated channel 66 for appreciable impact against the near side 18 of the guide rod 11 at the entrance location 20. As a result, such freely traveling marbles may tend to bounce back away from the guide rod 11 over the crown of the oscillatory roller 10 into the rejects receiving means 47. This undesirable escape is effectively prevented by suitable guard means associated with the supply channel 66 at the entrance location 20 that includes marble stop structure 67 mounted above the oscillatory roller 10 in opposed relation to and spaced laterally from the marble-engaging side portion 18 of the guide rod 11 a distance greater than the marble diameter. This stop structure 67 may be in the form of a flange having a substantially upright inside face opposed to the point of impact of marbles with the marble-engaging side portion of the guide rod 11 at 18 when supplied by the supply channel 66, against which each marble may bounce back into the trough 12–18 adjacent the marble-engaging side portion of the guide rod. Preferably, such guard means which is associated with the supply channel 66 includes additional marble stop structure 68 mounted laterally above the trough 12–18 at the entrance location 20 a distance greater than the marble diameter to permit marbles to roll therebeneath down the trough while confining them to the latter, so as to prevent any of the supplied marbles, upon impact with the guide member 11, from bouncing up and over the latter into the rejects receiving means 47. Such overhead stop structure 68 may also be in the form of a flange which has a lower face extending laterally substantially parallel to the axis of the oscillatory roller 10. Such guard flanges 67 and 68 together define a tunneled marble restrictive guard cage through which the supplied marbles can roll down the selecting and rejecting trough.

FIG. 6 is a diagrammatic illustration of the relative positions and approximate relative sizes to about half scale of the basically required elements of one of the selecting and rejecting troughs of the present invention, indicating critical factors and operating characteristics thereof with respect to a substantially spherical marble illustrated by dot-dash lines at 70, and an unacceptable broken cullet illustrated in full lines at 71, having a mean diameter D$m$. Since the drive mechanism of the embodiment illustrated in FIGS. 1 to 5 incl. provides an oscillatory throw through an angle $\alpha$ of about 100° (see FIG. 3) of oscillatory roller 10, which is of a diameter D$m$, such angle of throw is indicated in FIG. 6 between a given point on the roller peripheral surface 12 at its maximum return location 72 and the location of this point at 73 at maximum advance thereof during the advancing one half cycle of an oscillation of the roller 10. It will be noted therefrom that the guide member 11, in the form of a cylindrical rod, is mounted to the left side of the top portion of the roller 10 to provide a marble-engaging longitudinal side portion, indicated at 18, spaced transversely from the peripheral surface of the roller a distance less than the marble diameter D$m$. The space S between the guide rod 11 and the surface 12 of the oscillatory roller 10 at points of nearest approach is also less than this marble diameter so that there can be no escape of substantially spherical marbles, such as that indicated at 70, or a broken marble 71 having a relatively heavily fractured side 74 providing a localized flat thereon while being in the form of a body appreciably greater in width than the radius of such marble. It will also be noted therefrom that due to the oscillatory motion of the roller 10 the fractured area 74 has been caused to find a seating upon the crown of the surface 12 of the latter to provide appreciable frictional contact therewtih. This marble-engaging longitudinal side portion 18 of the guide rod 11 is offset transversely to the left of the vertical plane 19 through the axis of the oscillatory roller 10 a distance X which is greater than the radius of marble 70, so that an angle $\beta$ is provided between a radius through the center of mass of such marble and the vertical plane 19 on the left side of the latter. In the forward throw of the cycle of oscillation of the roller 10 the point at 72 will move arcuately to the location at 73 and, as a consequence, the fractured marble 71 will be carried forward by frictional contact of its fractured side 74 with the oscillatory roller surface 12, in the direction of the arrow 75, sufficiently far so that it can no longer cling to the roller surface 12, thus permitting it to fall into any suitable receiving means located beneath the right side of this oscillatory roller. At the same time the substantially spherical marble 70 will merely spin about its center to remain in the trough 12–18 and roll down the trough to the delivery end 21 thereof for dropping off into any suitable good marble collecting means.

FIG. 7 is a similar diagrammatic representation of a modification of the separating and rejecting trough 12–118 defined between the oscillatory roller 10 and a guide member 111 of modified form. Guide member 111 in FIG. 7 is illustrated as being in the form of a rod which is rectangular or square in cross-section, so oriented that one of its square edges provides at 118 the marble-engaging longitudinal side portion. The other relations of parts and operational functioning of FIG. 7 are similar to those described above in connection with FIG. 6.

While the embodiments of FIGS. 6 and 7 present substantial line contact respectively at 18 and 118 for the curved surface of either a substantially spherical marble 70 or a similar one 71 having appreciably less than one-half of its mass broken away, the FIG. 8 diagrammatic illustration indicates that the guide member 111 may be in the form of an elongated element which presents a flat side surface 76 for contact by the cullet. Marble 70 will roll down against the flat surface 76 along a contact line element thereof and the broken cullet 71 will have substantial point contact therewith at 218.

It will thus be understood from FIGS. 6, 7 and 8 that the guide member, such as 11 or 111, may be in various forms as to the cross-sectional shape thereof. It is also indicated in FIG. 8 that operability in rejecting an unacceptable cullet, such as that illustrated at 71, does not necessarily depend upon the return of the oscillatory action to a point of commencement of the forward throw which is located to the left of the vertical plane 19 at a radial angle equal to that of the throw advance to its terminal point. In FIG. 8 the angle of throw $\alpha$ is appreciably less than the angle of throw $\alpha$ of FIGS. 6 and 7 while the points of commencement and termination of the forward throw 172 and 173 are located farther forward. Location of point 173 farther forward over the arcuate shoulder of the crowned top half of the oscillatory roller 10 may give greater assurance of drop off of the broken cullet 71.

The diagrammatic showing in FIG. 9 indicates that the relative diameters of the oscillatory roller 100 and of the cylindrical guide rod 211 is not critical. It is therein indicated that the diameters of the oscillatory roller 100 and cylindrical guide rod 211 may be substantially equal so long as they define together a trough 112–318 in which the marble-engaging side portion 318 of the guide rod is offset to the left of the vertical plane 19 a distance greater than the marble radius and the throw of the peripheral surface 112 of the oscillatory roller from point 272 to point 273, through the angle $\alpha$, is sufficient to move a broken cullet, such as that illustrated at 71, far enough over the curved shoulder of the oscillatory roller surface to assure its fall off.

The operation of the sorter or selecting and rejecting feeder illustrated by way of example in FIGS. 1 to 5 incl. is believed to be obvious from the above description. As is therein indicated marbles and pieces thereof are supplied from a suitable source of feeding mechanism, such as the gravity feed channel 66, to the entrance location 20 of the open-bottom trough 12–18 defined between the top crowned portion of the oscillatory roller, such as 10, and the near side at 18 of the guide member or rod, such as 11, arranged generally parallel thereto and offset to the far side of the vertical plane 19. Rapid vibration of the feed channel 66 assures that all cullet bodies will move down the feed channel 66 to the entrance location 20 of this separating and rejecting trough 12–18. The cullet bodies which are substantially spherical marbles 70, or major portions thereof that have a tendency to roll about at least some of their axes, are delivered to the trough 12–18 at this entrance location 20 within a guard cage or housing, such as 67–68, located opposite and above the point of impact with the marble-engaging side portion of the guide member or rod 11, such as that at 18, so as to prevent such readily rollable bodies from bouncing back away from the guide member over the oscillatory roller 10 or up over such guide member into the rejects receiving means or collecting pan 47 mounted beneath the trough, thereby stabilizing such rollable cullet for roll down the trough toward its lower delivery end at 21. The roller 10 is oscillated about its axis to move the top crowned section of its peripheral surface 12 arcuately back and forth so as to break up any tendency of stability of roll thereof about any particular diameter. This does not interfere with rolling progress of substantially spherical marbles down the trough, but damaged marbles having relatively large areas of flatting or fractured sides, as well as projecting nibs, will thus be caused to find a seating on the oscillated crowned surface section of the roller 10 for frictional cling thereto sufficient to permit it to be carried transversely to the far side of this oscillatory roller for drop off into the rejects receiving means 47. The substantially spherical marbles 70 merely spin in the trough 12–18 back and forth and roll down the latter during such oscillator yaction, ultimately to be discharged at the lower delivery end 21 of the trough into acceptable marble collecting means or delivery chute 53 for supply to one or more points of use.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described our invention, what we claim as new and desire to secure by Letters Patent is the novel subjects matter defined in the following claims.

1. A sorter for marbles of certain diameter which is selectively rejectable of misshapen marbles and marble fragments comprising, in combination:
   (1) an elongated roller having a marble-engaging peripheral surface and rotatably supported upon a laterally-extending axis with one end thereof mounted at an elevation slightly higher than its other end,
   (2) an elongated guide member mounted to extend generally in the same direction as does the longitudinal dimension of said roller and to one side of the top portion of the latter, said guide member having a marble-engaging longitudinal side portion spaced transversely from the peripheral surface of said roller a distance less than the marble diameter and offset transversely to one side of a vertical plane through the longitudinal center-line of said roller a distance which is greater than the marble radius, said roller and guide member together defining a gravity delivery trough having an acceptable, substantially-spherical marble delivery end which is lower than an entrance location along the trough that is nearer the other end of the latter,
   (3) driving means rotatably to oscillate said roller through an appreciably large radial angle which rotates any given point on said roller peripheral surface transversely along an arcuate path appreciably longer than the mentioned offset distance,
   (4) rejects receiving means mounted along the longitudinal side of said roller which is located to the opposite side of said vertical plane, and
   (5) acceptable marble collecting means mounted at the delivery end of said trough.

2. The marble sorter of claim 1 in which said elongated guide member is supported by means including adjustable means at at least one end of said guide member which permits its marble-engaging longitudinal side portion to be moved transversely in a manner so that the offset distance of this side portion relative to said vertical plane at at least one end of the trough may be varied.

3. The marble sorter of claim 2 in which said adjustable means is embodied in the amount of the end of said guide member at the highest elevation which is nearest the entrance location.

4. The marble sorter of claim 1 in which said elongated roller and guide member are in the form of cylindrical elements having straight line axes with each of substantially uniform diameter from end-to-end, said guide member being a cylindrical rod.

5. The marble sorter of claim 4 in which fixed location mounting means are provided for the opposite ends of said roller to maintain the orientation of the axis of the latter, mounting means is provided for the delivery end of said rod at the delivery end of said trough and transversely adjustable mounting means is provided for the opposite end of said rod.

6. The marble sorter of claim 1 in which is provided marble supply means at the entrance location, and guard means associated with said supply means comprising marble stop structure mounted above said roller in opposed relation to and spaced laterally from said marble-engaging side portion of said guide member a distance greater than said marble diameter, said stop structure being mounted transversely opposite the point of impact of marbles with said guide member when supplied by said supply means to said trough to prevent supplied marbles from bouncing back away from said guide member over said roller into said rejects receiving means.

7. The marble sorter of claim 6 in which said stop structure is in the form of a flange having an upwardly extending face opposed to the marble-engaging side of said guide member.

8. The marble sorter of claim 6 in which said guard means includes additional marble stop structure mounted laterally above said trough at the entrance location a distance greater than said marble diameter to permit marbles to roll therebeneath down the trough while confining them to the latter, thereby preventing the supplied marbles upon impact with said guide member from bouncing up and over said guide member.

9. The marble sorter of claim 8 in which said stop structures respectively have faces arranged upwardly in opposition to said guide member and laterally over and appreciably above said trough in opposition to the latter together forming a tunneled marble restrictive cage through which the supplied marbles can roll down said trough.

10. The marble sorter of claim 9 in which said marble supply means is in the form of an elongated channel terminating in said tunneled guard cage with the width of said channel being sufficient to permit marbles successively to roll therealong, said channel being supported above said roller and crossing obliquely over the latter toward said entrance location and forward in the direction of roll of the supplied marbles down said trough with said channel extending obliquely down in the forward direction for roll of marbles therealong.

References Cited

UNITED STATES PATENTS 2,692,046  10/1954  Clary et al. _____ 209—101

FOREIGN PATENTS 939,117  11/1948  France.

ALLEN N. KNOWLES, *Primary Examiner.*